United States Patent
Nishio et al.

(10) Patent No.: US 7,915,378 B2
(45) Date of Patent: Mar. 29, 2011

(54) MATERIAL FOR SOLID POLYMER ELECTROLYTE, AND POLYETHER POLYMER AND PROCESS FOR PRODUCING SAME

(76) Inventors: Hideyuki Nishio, Tokyo (JP); Hidenori Onishi, Tokyo (JP); Paul-Andre Lavoie, Montreal (CA); Richard Laliberte, Ste-Julie (CA)

( * ) Notice: Subject to any disclaimer, the term of this patent is extended or adjusted under 35 U.S.C. 154(b) by 0 days.

(21) Appl. No.: 11/907,685

(22) Filed: Oct. 16, 2007

(65) Prior Publication Data
US 2008/0044731 A1   Feb. 21, 2008

Related U.S. Application Data

(62) Division of application No. 10/512,432, filed as application No. PCT/JP03/05392 on Apr. 25, 2003, now abandoned.

(30) Foreign Application Priority Data

Apr. 26, 2002   (JP) .................................. 2002-127433
Sep. 30, 2002   (JP) .................................. 2002-285069

(51) Int. Cl.
C08G 65/08 (2006.01)
C08G 65/14 (2006.01)
C08G 65/22 (2006.01)

(52) U.S. Cl. ......... 528/418; 525/393; 525/421; 429/312

(58) Field of Classification Search .................. None
See application file for complete search history.

(56) References Cited

U.S. PATENT DOCUMENTS

| | | | |
|---|---|---|---|
| 5,138,013 A | | 8/1992 | Mason |
| 5,202,009 A | | 4/1993 | Andrieu et al. |
| 5,429,759 A | | 7/1995 | Andrieu et al. |
| 5,962,171 A | * | 10/1999 | Boguslavsky et al. ........ 429/325 |
| 6,201,071 B1 | | 3/2001 | Miura et al. |
| 6,878,491 B1 | * | 4/2005 | Miura et al. .................. 429/309 |
| 2001/0014420 A1 | * | 8/2001 | Takeuchi et al. .............. 429/209 |
| 2003/0215710 A1 | * | 11/2003 | Lavoie et al. ................. 429/212 |
| 2004/0024174 A1 | * | 2/2004 | Harvey et al. ................. 528/421 |
| 2005/0059798 A1 | * | 3/2005 | Onishi et al. .................. 528/421 |

FOREIGN PATENT DOCUMENTS

| | | | |
|---|---|---|---|
| EP | 657484 | * | 6/1995 |
| EP | 0 838 487 A2 | | 4/1998 |
| EP | 0 885 913 A1 | | 12/1998 |
| EP | 0 897 941 A1 | | 2/1999 |
| EP | 0945476 A1 | | 9/1999 |
| EP | 0 994 143 A1 | | 4/2000 |
| EP | 1 454 939 A1 | | 9/2004 |
| GB | 2143539 | * | 2/1985 |
| JP | 2-5370 A | | 1/1990 |
| JP | 5-271637 A | | 10/1993 |
| JP | 5-290615 A | | 11/1993 |
| JP | 5-290883 A | | 11/1993 |
| JP | 6-322102 A | | 11/1994 |
| JP | 2003-105080 A | | 4/2003 |
| JP | 2003-138003 A | | 5/2003 |

* cited by examiner

*Primary Examiner* — David Buttner

(74) *Attorney, Agent, or Firm* — Birch, Stewart, Kolasch & Birch, LLP

(57) ABSTRACT

A material for solid polymer electrolyte, made of a polyether polymer having a moisture content in the range of 400 to 5,000 ppm by weight. A formed solid polymer electrolyte, which is made by mixing the material for solid polymer electrolyte together with an electrolyte salt compound soluble in the polyether polymer, has good ionic conductivity and high mechanical strength. A polyether polymer having a moisture content not larger than 0.04% by weight and a toluene-insoluble content not larger than 5% by weight. This polyether polymer gives a formed solid polymer electrolyte having a smooth surface.

2 Claims, No Drawings form of film in the course of production. Therefore, it is required that solid polymer electrolytes have good film-forming property, and the film thickness is rendered as thin as possible to enhance the capacity of battery.

MATERIAL FOR SOLID POLYMER ELECTROLYTE, AND POLYETHER POLYMER AND PROCESS FOR PRODUCING SAME

CROSS-REFERENCE TO RELATED APPLICATIONS

This application is a divisional of application Ser. No. 10/512,432, filed Sep. 16, 2005, now abandoned which in turn is a U.S. national phase under 35 U.S.C. §371 of PCT/JP03/05392, filed Apr. 25, 2003. Priority to application Ser. No. 10/512,432 and to PCT/JP03/05392 is claimed under 35 U.S.C. §120. Priority to Japanese Application No. 2002-127433 filed Apr. 26, 2002 and to Japanese Application No. 2002-285069 filed Sep. 30, 2002 is claimed under 35 U.S.C. §119. The entire contents of each of the foregoing applications are incorporated herein by reference.

TECHNICAL FIELD

This invention relates to a material used for forming solid polymer electrode, comprised of a polyether polymer, a formed solid polymer electrolyte and a process for making the same, and a polyether polymer and a process for producing the same.

A formed solid polymer electrolyte made from the material for solid polymer electrolyte of the present invention exhibits high ionic conductivity and has high mechanical strength, and is suitable for electrochemical devices such as batteries, especially for a cathode of a lithium battery and other batteries.

BACKGROUND ART

As an electrolyte for batteries, liquid or gel electrolytes have heretofore been used because of their ionic conductivity. An outer casing having high mechanical strength must be used for batteries to avoid liquid leakage leading to damage of instruments. This poses a problem, for example, interferes with miniaturization or weight reduction of batteries.

To solve the above-mentioned problem, solid polymer electrolytes are being examined. Solid polymer electrolytes have good processability and pliability and therefore batteries can have various shapes without restriction. Further, solid polymer electrolytes have no fluidity and hence batteries possess a high safety.

For example, a proposal has been made wherein an ethylene oxide-propylene oxide copolymer having incorporated therein an alkali metal salt is adopted as an ion-conductive solid electrolyte (Japanese Unexamined Patent Publication [hereinafter abbreviated to "JP-A"] No. S61-83249, JP-A S63-136407 and JP-A H2-24975). However, higher ionic conductivity and higher mechanical strength are now desired for the ion-conductive solid electrolyte. Further, solid polymer electrolytes used for batteries are handled usually in the form of film in the course of production. Therefore, it is required that solid polymer electrolytes have good film-forming property, and the film thickness is rendered as thin as possible to enhance the capacity of battery.

A polymeric material having high mechanical strength including high tensile modulus is required as a material for solid electrolyte to give a film of solid polymer electrolyte exhibiting high mechanical strength even though the film thickness is thin. However, such polymeric material generally exhibits a high melt viscosity and poor fluidity in a molten state at a film-forming process. To lower the melt viscosity, a plasticizer is usually incorporated in the polymeric material, but, a large amount of plasticizer must be incorporated to lower the melt viscosity to the desired extent. The incorporation of a large amount of plasticizer poses other problems in that the polymeric material tends to stick to a roll or other devices at a film-forming process, especially at an extruding step, with the results that the processability is reduced and the resulting shaped or formed solid polymer electrolyte has poor mechanical strength. Further, the incorporation of a large amount of plasticizer results in reduction of ionic conductivity of the solid polymer electrolyte, leading to deterioration of battery performance.

In the case when a polyether polymer is used as a solid electrolyte, a procedure is generally adopted wherein a polyether polymer having a crosslink-forming reactive functional group is formed into a film, and the film is cured with a radical initiator such as an organic peroxide, or with active radiation whereby a crosslink is formed. The polyether polymer having a crosslink-forming reactive functional group is prepared by copolymerization of a crosslink-forming monomer. Therefore, crosslinking tends to occur to some extent at the step of copolymerization to produce a polymer having a crosslinked structure. When a solid polymer electrolyte film is formed from a polymer containing a large amount of crosslinked structure, the polymer has poor processability and the resulting electrolyte film has poor uniformity with the results that performance and safety of batteries are reduced.

An attempt has been made wherein a polymerization catalyst prepared by reaction of triisobutylaluminum with an organic acid salt of diazabicycloundecene and with phosphoric acid, is used for polymerization to reduce the undesirable crosslinking occurring at a polymerization step (Japanese Examined Patent Publication No. S56-51171). Further, the present inventors have proposed a method of conducting polymerization in the presence of Lewis base substance having no active hydrogen atom to further reduce the undesirable crosslinking occurring at a polymerization step (Japanese Patent Application No. 2001-341155). However, the contents of crosslinked structure in the collected polymers are liable to have poor evenness. Thus, a method of producing a polyether polymer having a more reduced content of crosslinked structure is desired.

DISCLOSURE OF THE INVENTION

In view of the foregoing, an object of the invention is to provide a material for solid polymer electrolyte having high processability and high formability or shapability and giving a formed solid polymer electrolyte exhibiting high ionic conductivity and having high mechanical strength; a formed solid polymer electrolyte made from the material for solid electrolyte; and a process for making the formed solid polymer electrolyte.

Another object of the present invention is to provide a polyether polymer having a greatly reduced content of crosslinked structure, which is suitable as a solid electrolyte; and a process for producing the polyether polymer.

To achieve the above-mentioned objects, the present inventors have made extensive researches and found that, when a polyether polymer having a specific moisture content is extruded into a film, the polymer exhibits a drastically reduced melt viscosity and very enhanced fluidity, as compared with a polyether polymer not containing water, and thus, the polymer exhibits good processability and good releasability from a roll or other devices. They have further found that, although a polymeric material for solid polymer electrolyte containing a specific amount of water is used, the resulting formed solid polymer electrolyte contains a reduced amount of water and has good ionic conductivity and high mechanical strength. The present invention has been completed on the basis of these findings.

Thus, in a first aspect of the present invention, there is provided a material for solid polymer electrolyte, characterized by being comprised of a polyether polymer having a moisture content in the range of 400 to 5,000 ppm by weight.

In a second aspect of the present invention, there is provided a formed solid polymer electrolyte made by mixing the above-mentioned material for solid polymer electrolyte together with an electrolyte salt compound soluble in the polyether polymer, and then shaping the thus-obtained mixture.

In a third aspect of the present invention, there is provided a process for making a formed solid polymer electrolyte, characterized in that a material for solid polymer electrolyte, comprised of a polyether polymer having a moisture content in the range of 400 to 5,000 ppm by weight, is mixed together with an electrolyte salt compound soluble in the polyether polymer, and then the thus-obtained mixture is formed.

In a fourth aspect of the present invention, there is provided a polyether polymer having a moisture content not larger than 0.04% by weight and a toluene-insoluble content not larger than 5% by weight.

In a fifth aspect of the present invention, there is provided a process for producing a polyether polymer comprising the steps of subjecting oxirane monomers to a ring-opening polymerization, stopping the polymerization reaction, and then removing a solvent from a polymerization mixture, characterized in that the moisture content in a system containing the polyether polymer is controlled to a value not larger than 0.04% by weight, based on the weight of the produced polyether polymer, during the course of the polymerization reaction-stopping step and the succeeding step.

In a sixth aspect of the present invention, there is provided a solid polymer electrolyte characterized by comprising a polyether polymer having a moisture content not larger than 0.04% by weight and a toluene-insoluble content not larger than 5% by weight, and an electrolyte salt compound soluble in the polyether polymer.

BEST MODE FOR CARRYING OUT THE INVENTION

Material for Solid Polymer Electrolyte

The material for solid polymer electrolyte of the present invention is comprised of a polyether polymer having a moisture content in the range of 400 to 5,000 ppm by weight.

It is a matter of common knowledge to a person skilled in the art that, if a solid polymer electrolyte contains water, the electrolyte is susceptible to deterioration due to the reaction with an electrolyte salt compound, and consequently, the performance of battery is reduced. Therefore, an endeavor has heretofore been made to reduce the moisture content in a polyether polymer for the electrolyte as much as possible. In contrast to this common knowledge, the material for solid polymer electrode of the present invention is characterized as containing water in an amount larger than that usually contained in the conventional material for solid polymer electrolyte.

The amount of water contained in a polyether polymer constituting the material for solid electrolyte of the present invention is preferably in the range of 700 to 4,000 ppm by weight, and more preferably 1,000 to 3,000 ppm by weight. If the moisture content in polyether polymer is too small, the material exhibits high melt viscosity and a thin solid polymer electrolyte film having a sufficiently reduced thickness is often difficult to obtain. In contrast, if the moisture content in polyether polymer is too large, the resulting solid polymer electrolyte film contains a large amount of water and the battery tends to have poor service capacity and poor cycle life.

Water contained in a specific amount in the material for solid polymer electrolyte of the present invention exhibits a remarkable plasticized function, and thus, when the material is extruded, the die pressure of an extruder is stabilize at a low pressure, and therefore a thin film can be stably produced. Although the material contains water, the water content in the resulting solid polymer electrolyte film does not exceeds the tolerance upper limit, and therefore, a battery having a high service capacity can be fabricated from the film.

The polyether polymer used in the present invention is not particularly limited provided that it is mainly comprised of oxirane repeating units formed by ring-opening polymerization of an oxirane monomer. The kind of oxirane monomer is also not particularly limited, but the polyether polymer used in the present invention is preferably mainly comprised of units (A) derived from an ethylene oxide monomer (a), and especially preferably comprises 70 to 99% by mole of units (A) derived from an ethylene oxide monomer (a), and 1 to 30% by mole of units (B) derived from other oxirane monomer (b) copolymerizable with the ethylene oxide monomer (a).

The amount of units (A) derived from an ethylene oxide monomer (b) in the polyether polymer is more preferably in the range of 80 to 98% by mole, especially preferably 90 to 97% by mole. If the amount of ethylene oxide monomer units (A) is too small, a formed solid polymer electrolyte made from a material for solid polymer electrolyte comprised of the polyether polymer has poor mechanical strength and, when the formed solid polymer electrolyte is a film made by extrusion, the extruded film tends to stick to a roll or other devices at an extrusion step, and therefore, a thin film is often difficult to obtain with stability. In contrast, if the amount of ethylene oxide monomer units (A) is too large, the resulting formed solid polymer electrolyte is liable to have poor ionic conductivity, leading to deterioration of battery performance at a low temperature.

The amount of the above-mentioned oxirane monomer units (B) is more preferably in the range of 2 to 20% by mole, especially preferably 3 to 15% by mole and most preferably 7 to 10% by mole.

The oxirane monomer (b) copolymerizable with ethylene oxide monomer (a), forming the above-mentioned oxirane monomer units (B), includes alkylene oxides having 3 to 20 carbon atoms, glycidyl ethers having 1 to 10 carbon atoms, and oxides of a vinyl compound.

As specific examples of the alkylene oxides having 3 to 20 carbon atoms, there can be mentioned chain alkylene oxides such as propylene oxide, 1,2-epoxybutane, 1,2-epoxyisobutane, 2,3-epoxybutane, 1,2-epoxyhexane, 1,2-epoxyoctane, 1,2-epoxydecane, 1,2-epoxytetradecane, 1,2-epoxyhexadecane, 1,2-epoxyoctadecane and 1,2-epoxyeicosane; and cycloalkylene oxides such as 1,2-epoxycylopentane, 1,2-epoxycyclohexane and 1,2-epoxycyclododecane. As specific examples of the glycidyl ethers having 1 to 10 carbon atoms, there can be mentioned alkyl glycidyl ethers such as methyl glycidyl ether, ethyl glycidyl ether and butyl glycidyl ether; and aryl glycidyl ethers such as phenyl glycidyl ether. As a specific example of the oxides of a vinyl compound, there can be mentioned styrene oxide. Of these, chain alkylene oxides are preferable. Propylene oxide and 1,2-epoxybutane are especially preferable because of high polymerizability. These oxirane monomers (b) may be used either alone or as a combination of at least two thereof.

The oxirane monomer (b) may comprises a diepoxy compound, in addition to the monomer selected from the above-mentioned alkylene oxides, glycidyl ethers and oxides of a vinyl compound, which diepoxy compound includes, for example, vinylcyclohexene dioxide, butadiene dioxide, ethylene glycol diglycidyl ether and polyethylene glycol diglycidyl ether. By copolymerization of these diepoxy compounds as a part of oxirane monomers (b), a branched structure can be introduced in oxirane monomer units (B). In the case when the diepoxy compound is used, it's amount is preferably in the range of 0.1 to 5% by mole, based on the total amount of ethylene oxide monomer (a) and oxirane monomers (b).

In the case when a formed solid polymer electrolyte made from the material for solid polymer electrolyte of the present invention is used as a crosslinked formed solid electrolyte, an oxirane monomer (c) having a crosslink-forming functional group is preferably used as a part of the above-mentioned oxirane monomer (b) (the oxirane monomer (c) is hereinafter referred to as "crosslink-forming oxirane monomer (c)" when appropriate). By the term "crosslink-forming functional group" as used herein, we mean a functional group which is capable of forming a crosslinked structure by heating or irradiation with active radiation. By using the crosslink-forming monomer as a part of the oxirane monomers (b), when a formed solid polymer electrolyte made from the material for solid polymer electrolyte of the present invention is used as a crosslinked formed solid electrolyte, the crosslink can easily be formed, and therefore, a solid polymer electrolyte film having a high strength can easily be obtained.

When the oxirane monomer (c) is used, its amount is such that the upper limit is usually 15% by mole, preferably 9% by mole, more preferably 7% by mole and especially preferably 5% by mole and the lower limit is preferably 1% by mole and more preferably 2% by mole, based on the amount of the total oxirane monomers used for the preparation of a polyether polymer. When the amount of oxirane monomer (c) is too large, the material for solid polymer electrolyte is liable to be cured to cause gelling reaction, and thus the processability and shapability of the material for solid polymer electrolyte are deteriorated. In contrast, when the amount of oxirane monomer (c) is too small, a formed solid polymer electrolyte having a high strength is difficult to obtain.

The crosslink-forming oxirane monomer (c) includes halogenated epoxy compounds and epoxy compounds having a vinyl group. As specific examples of the halogenated epoxy compounds, there can be mentioned halogenated alkylene oxides which include epihalohydrins such as epichlorohydrin, epibromohydrin, epiiodohydrin, epifluorohydrin and β-methylepichlorohydrin; p-chlorostyrene oxide; and dibromophenyl glycidyl ether.

As specific examples of the epoxy compounds having a vinyl group, there can be mentioned ethylenically unsaturated glycidyl ethers such as vinyl glycidyl ether, allyl glycidyl ether, butenyl glycidyl ether and o-allylphenyl glycidyl ether; monoepoxides of diene or polyene such as butadiene monoepoxide, chloroprene monoepoxide, 4,5-epoxy-2-pentene, 3,4-epoxy-1-vinylcyclohexene and 1,2-epoxy-5,9-cyclododecadiene; alkenylepoxides such as 3,4-epoxy-1-butane, 1,2-epoxy-5-hexene and 1,2-epoxy-9-decene; and glycidyl esters of an ethylenically unsaturated carboxylic acid such as glycidyl acrylate, glycidyl methacrylate, glycidyl crotonate, glycidyl 4-heptonoate, glycidyl sorbate, glycidyl linoleate, glycidyl 4-methyl-3-pentenoate and 3-cyclohexenecarboxylic acid glycidyl ester, and 4-methyl-3-cyclohexenecarboxylic acid glycidyl ester.

The crosslink-forming oxirane monomer (c) may be used either alone or as a mixture of at least two thereof. Of these crosslink-forming oxirane monomers, halogen-substituted oxirane monomers and ethylenically unsaturated glycidyl ethers are preferable. Allyl glycidyl ether and epichlorohydrin are especially preferable.

A polymerization catalyst used for ring-opening polymerization of oxirane monomers is not particularly limited provided that it is generally used for polymerization for the production of a polyether polymer. The polymerization catalyst includes, for example, a catalyst prepared by reacting an organic aluminum compound with water and acetyl acetone (Japanese Examined Patent Publication [hereinafter abbreviated to as "JP-B"] No. S35-15797), a catalyst prepared by reacting triisobutylaluminum with phosphoric acid and triethylamine (JP-B S46-27534), a catalyst prepared by reacting triisobutylaluminum with an organic acid salt of diazabicyloundecene and with phosphoric acid (JP-B S56-51171); catalysts containing an organic zinc compound such as a catalyst comprised of a partially hydrolyzed product of an aluminum alkoxide and an organic zinc compound (JP-B S43-2945), a catalyst comprised of an organic zinc compound and a polyhydric alcohol (JP-B S45-7751), and a catalyst comprised of a dialkylzinc and water (JP-B S36-3394); catalysts containing an organic tin compound such as a catalyst comprised of an organic tin compound and a phosphoric acid ester compound (JP-B S46-41378); and catalysts containing an alkali metal such as potassium hydroxide and sodium hydroxide.

Of these, catalysts containing an organic aluminum compound, and catalysts containing an organic tin compound are preferable because undesirable crosslinking occurring during polymerization can be minimized. Catalysts containing an organic aluminum compound are more preferable. A catalyst prepared by reacting triisobutylaluminum with phosphoric acid and triethylamine is especially preferable. Catalysts containing an organic aluminum compound and catalysts containing an organic tin compound have a dehydrating function and thus can suppress the formation of crosslinked structure. A catalyst prepared by reacting triisobutylaluminum with an organic acid salt of diazabicyloundecene and with phosphoric acid is most preferable because undesirable production of ingredients insoluble in toluene can be minimized with the results that a solid polymer electrolyte film having a high strength can be obtained.

A Lewis base substance having no active hydrogen is preferably incorporated in a polymerization system for polymerization reaction. By the incorporation of a Lewis base substance having no active hydrogen, undesirable crosslinking occurring during polymerization can be more markedly suppressed. As specific examples of the Lewis base substance having no active hydrogen, there can be mentioned nitrite compounds such as acetonitrile and benzonitrile; cyclic ether compounds such as tetrahydrofuran and dioxane; isocyanate compounds such as phenyl isocyanate; ester compounds such as methyl acetate, ethyl acetate, butyl acetate, methyl propionate and ethyl propionate; alkali metal alkoxide compounds such as potassium-t-amyl oxide and potassium-t-butyl oxide; phosphine compounds such as triphenylphosphine; and sulfoxides such as dimethylsulfoxide.

Of these, nitrile compounds, cyclic ether compounds and ester compounds are preferable. Acetonitrile, tetrahydrofuran, dioxane and ethyl acetate are more preferable. Acetonitrile is especially preferable.

These Lewis base substances may be used either alone or as a combination of at least two thereof. The amount of Lewis base substance is usually in the range of 0.01 to 20% by weight, preferably 0.05 to 10% by weight and more preferably 0.1 to 5% by weight, based on the weight of the total monomers.

A polymerization solvent used is not particularly limited provided that a polymerization catalyst is not deactivated. The polymerization solvent includes, for example, aromatic hydrocarbons such as benzene and toluene; straight-chain saturated hydrocarbons such as n-pentane and n-hexane, and alicyclic hydrocarbons such as cyclopentane and cyclohexane. The amount of polymerization solvent is not particularly limited, but is usually such that the concentration of monomers is in the range of 1 to 50% by weight, preferably 10 to 30% by weight.

As the polymerization procedure, a solution polymerization procedure and a solvent slurry polymerization procedure can be employed. A solvent slurry polymerization procedure using a polymerization solvent such as n-pentane, n-hexane or cyclopentane is preferable.

In the solvent slurry polymerization procedure, a polymerization catalyst is preferably pre-treated with a monomer giving a polymer insoluble in the solvent and a monomer giving a polymer soluble in the solvent to obtain a stable polymerization system. The pre-treatment of the polymerization catalyst can be carried out by mixing catalyst ingredients with small amounts of the above-mentioned monomers and aging the mixture at a temperature of 0 to 100° C., preferably 30 to 50° C., for 10 to 30 minutes. By using the thus-aged catalyst, undesirable deposition of polymer on the inner wall of a polymerization vessel can be avoided.

The polymerization reaction can be carried out at a temperature of 0 to 100° C., preferably 30 to 70° C. Any of batchwise, semi-batchwise and continuous polymerization methods can be adopted.

The moisture content in a polyether polymer constituting the formed solid polymer electrolyte of the present invention must be adjusted so that the moisture content falls within the specific range. The method for adjusting the moisture content is not particularly limited, and, as examples of the method for adjusting the moisture content, there can be mentioned (1) a method wherein a predetermined amount of water is added into a polymerization mixture as produced at the termination of polymerization, and then, a polymer is recovered from the water-added polymerization mixture and the recovered polymer is dried until the moisture content reaches a desired value; (2) a method wherein a polymer is recovered from a polymerization mixture, and the recovered polymer is dried while an inert gas containing a predetermined amount of moisture is fed into a drying apparatus, or while the drying conditions are desirably controlled; and (3) a method wherein a polymer is recovered from a polymerization mixture, and the recovered polymer is dried to a moisture content below 400 ppm by weight, and then, the dried polymer is placed in contact with an inert gas or air, which contains a predetermined amount of moisture, for a predetermined period of time until the moisture content in polymer reaches a desired value. These methods may be adopted either alone or as a combination of at least two thereof.

More specifically, in the above-mentioned method (1), all of the monomers, polymerization medium and polymerization catalyst are previously dehydrated, and the polymerization is carried out in a reaction vessel having been flushed with dry inert gas. Distilled water is added into the polymerization mixture as obtained by polymerization, and then, the polymer is recovered from the water-added polymerization mixture. The recovered polymer is dried to the desired moisture content. It is preferable that the amount of water to be added to the polymerization mixture, and the conditions for recovering and drying are determined previously by experiments so that the desired moisture content is easily obtained.

The polyether polymer used in the present invention usually has a weight average molecular weight (Mw) in the range of 10,000 to 10,000,000, preferably 30,000 to 5,000,000, more preferably 100,000 to 1,500,000, especially preferably 150,000 to 1,000,000 and most preferably 200,000 to 600,000.

The molecular weight distribution (as expressed by Mw/Mn where Mn is number average molecular weight) of the polyether polymer is preferably in the range of 1.5 to 13, more preferably 1.6 to 12 and especially preferably 1.7 to 11.

When Mw is in the above range, a material for solid polymer electrolyte comprised of the polyether polymer exhibits good fluidity and good shape-retention when the material for solid polymer electrolyte is extruded to form a film, and the resulting solid polymer electrolyte film has good pliability and high mechanical strength. If Mw is too large, the melt viscosity is high and the torque and die pressure of shaping machine are increased to undesirable extent with the result that the shaping tends to become difficult. In contrast if Mw is too small, the resulting solid polymer electrolyte film has poor mechanical strength and is easily broken, and the film exhibits large tackiness. Thus, a thin film cannot be formed with good stability. If the ratio Mw/Mn is too large, the melt viscosity is high and the die pressure is increased to undesirable extent with the result that the shaping tends to become difficult, and the extruded film readily sticks to a roll.

If desired, additives can be added to the material for solid polymer electrolyte of the present invention, which include antioxidant, light stabilizer, lubricant, flame retardant, mildew-proofing agent, anti-static agent, colorant, reinforcing agent and filler.

The antioxidant is not particularly limited, and includes conventional antioxidants. As specific examples of the antioxidant, there can be mentioned phenol antioxidants such as 2,6-di-tert-butyl-4-methylphenol, n-octadecyl-3-(4'-hydroxy-3',5'-di-tert-butylphenyl)propionate, 4,4'-butylidenebis-(3-methyl-6-tert-butylphenol), 2,2'-methylene-bis-(4-ethyl-6-tert-butylphenol), and tetrakis-[methylene-3-(3',5'-di-tert-butyl-4'-hydroxyphenyl)propionate]methane; thiophenol antioxidants such as 4,4'-thiobis-(6-tert-butyl-3-methylphenol) and 2,2'-thiobis-(6-tert-butyl-4-methylphenol); and organic phosphate antioxidants such as triphenyl phosphite and tris(nonylphenyl) phosphate. Of these, phenol antioxidants are preferable. Hindered phenol antioxidants are especially preferable.

The amount of antioxidant is usually in the range of 0.001 to 3 parts by weight based on the total weight of oxirane monomers.

The reinforcing agent is not particularly limited, and usually oxides of aluminum, silicon, titanium, zinc, magnesium and calcium are used. Of these, silica is preferable because the reinforcing effect is prominent and the processability is greatly improved. The surface area of silica is not particularly limited, but is usually in the range of 50 to 400 $m^2/g$, preferably 70 to 250 $m^2/g$ and more preferably 90 to 150 $m^2/g$, as nitrogen adsorption specific surface area as measured by BET method. A silanol group present on the surface of silica generally reacts with lithium metal or lithium salt and hence deteriorates battery performance. Therefore, hydrophobic silica is especially preferable which is prepared by substituting the silanol group present on the surface by a hydrophobic group such as a methyl group.

The amount of reinforcing agent is usually in the range of 0 to 50% by weight, preferably 0.5 to 30% by weight and more preferably 1 to 20% by weight, based on the polyether polymer. If the amount of reinforcing agent is too large, a solid polymer electrolyte film or a cathode film is liable to have poor pliability and low ionic conductivity.

Polyether Polymer Having Moisture Content of not Larger than 0.04% by Weight and Toluene-Insoluble Content of not Larger than 5% by Weight A polyether polymer containing a small amount of moisture and a small amount of toluene-insolubles, especially a polyether polymer having a moisture content of not larger than 0.04% by weight and a toluene-insoluble content of not larger than 5% by weight, will be described.

The polyether polymer characterized by a small moisture content and a small toluene-insoluble content exhibits relatively poor formability or shapability and releasability, but can give a formed solid polymer electrolyte having smooth surface and exhibiting good electrical stability and good ionic conductivity, as compared with the above-mentioned polyether polymer having a moisture content of 400 to 5,000 ppm by weight.

The polyether polymer having a small moisture content and a small toluene-insoluble content can be produced by a process comprising the steps of subjecting oxirane monomers to a ring-opening polymerization, stopping the polymerization reaction, and then removing a solvent from a polymerization mixture, characterized in that the moisture content in a system containing the polyether polymer is controlled to a value not larger than 0.04% by weight, based on the weight of the produced polyether polymer, during the course of the polymerization reaction-stopping step and the succeeding step.

The above-mentioned process for producing the polyether polymer having a small moisture content and a small toluene-insoluble content will be described in detail.

The monomers and solvent, which are used for polymerization, are preferably dehydrated prior to the polymerization. The procedure for dehydration is not particularly limited, and includes, for example, a procedure of adsorbing moisture by an adsorbent such as molecular sieve, silica gel or active alumina; and an procedure for removing moisture by distillation or azeotropic distillation.

The total amount of moisture in the monomers and solvent, used for polymerization, are preferably not larger than 0.04% by weight, more preferably not larger than 0.03% by weight and especially preferably not larger than 0.02% by weight, based on the total weight of monomers.

Using a single reaction vessel, the preparation of catalyst and the polymerization can be carried out in a batchwise manner. Alternatively, using two reaction vessels, the preparation of catalyst can be carried out in one reaction vessel, and the polymerization can be carried out in the other reaction vessel either in a continuous manner while the prepared catalyst and the monomers are continuously fed into the vessel, or in a semi-batchwise manner while the prepared catalyst is placed in the vessel and the monomers are fed into the vessel. The addition of monomers may be carried out either at once or intermittently. The polymerization temperature is usually in the range of 0 to 100° C., preferably 50 to 90° C. The polymerization pressure is usually in the range of 0.1 to 2 MPa.

Subsequent to the polymerization step, a step of stopping the polymerization by adding a polymerization stopper in a polymerization mixture (which step is hereinafter referred to as "stopping step" when appropriate), and a step of recovering a polymer by removing a solvent from the polymerization mixture and collecting the polymer (which step is hereinafter referred to as "recovering step" when appropriate), are conducted. In the stopping step and the succeeding recovering step, the content of moisture in a system containing the polyether polymer is controlled to a value not larger than 0.04% by weight, preferably not larger than 0.03% by weight and more preferably not larger than 0.02% by weight.

In order to control the moisture content in a system containing the polymer to the above-mentioned low value, the moisture content in additives and a solvent, which are placed in contact with the polymer in the stopping step and the succeeding step, must be controlled to a value not larger than 0.04% by weight and the operations at the stopping step and the succeeding step must be carried out under conditions such that moisture is not incorporated from the environment. If a certain amount of moisture is present in the polymer-containing system at the stopping step and the succeeding step, crosslinking is promoted and consequently the above-mentioned polymer having a small moisture content and a small toluene-insoluble content is difficult to obtain.

The polymerization reaction-stopper (hereinafter abbreviated to as "stopper" when appropriate) used in the stopping step include alcohols, amines and fatty acids. Alcohols having 1 to 3 carbon atoms such as methanol, ethanol, n-propanol and isopropanol are preferable because the amount can be small, and these alcohols have a low boiling point and, after the addition thereof, the stopper can easily be separated in the succeeding recovering step. Ethanol is especially preferable. If the stopper remains in the polymer, it reacts with an electrode material and the battery performance tends to be affected.

The stopper is preferably dehydrated prior to the use thereof. The moisture content in the stopper is preferably not larger than 1,000 ppm, more preferably not larger than 700 ppm and especially preferably 500 ppm. If a stopper having a larger moisture content is used, the moisture content in the polymer-containing system at the stopping step is difficult to control to a value not larger than 0.04% by weight. As the procedure for dehydration, the same procedures as mentioned above for the dehydration of monomers and solvent can be adopted.

The amount of stopper varies depending upon the particular polymerization catalyst, but is usually in the range of 0.1 to 10 times, preferably 0.2 to 5 times and more preferably 0.5 to 2 times the amount of polymerization catalyst. When the amount of stopper is too small, polymerization reaction cannot be completely stopped and crosslinking tends to occur as an undesirable side reaction. In contrast, when the amount of stopper is too large, it is troublesome to remove moisture from the stopper to the desired extent.

The temperature and time for stopping the polymerization procedure can be chosen from a broad range, but the temperature is preferably in the range of 0 to 120° C., more preferably 15 to 100° C., and the time is in the range of 1 second to 10 hours, more preferably 5 minutes to 2 hours.

Stopping step can be carried either in the same reaction vessel as used for polymerization, or in another reaction vessel. The shape and material of the reaction vessel used in the stopping step, and a stirrer provided in the reaction vessel are not particularly limited, but, the reaction vessel is preferably of a type capable of being closed. When the stopping step is carried out in a closed reaction vessel, the contact of polymer with moisture in the air can be avoided. Dry nitrogen gas or dry air can be introduced into the reaction vessel so that the inner pressure is maintained at a positive pressure.

The polymer deposited on the inner wall of a reaction vessel used in the polymerization step or stopping step can be recovered by washing with a solvent, and then, incorporated with a polymer solution or slurry. The solvent used for washing can be chosen from those which are mentioned as the polymerization solvent.

The solvent used for washing is preferably dehydrated prior to use. The dehydration procedure can be the same as that for the polymerization solvent. The amount of moisture present in the washing solvent varies depending upon the amount of washing solvent, but is preferably not larger than 20 ppm by weight, more preferably not larger than 10 ppm.

Subsequent to the stopping step, the recovering step is carried out. In the recovering step, an antioxidant is preferably incorporated before the removal of solvent. As the antioxidant, a conventional antioxidant can be used as mentioned above.

The removal and drying of solvent is preferably carried out under conditions such that the polymer is not contacted with moisture, more specifically, in a dry nitrogen gas or dry air atmosphere, or under a reduced pressure. If these procedures are carried out, for example, in an ordinary air atmosphere, the polymer absorbs moisture from the air with the result that crosslinking tends to occur. The removal and drying of solvent are usually carried out at a humidity of not larger than 2 $g/m^3$, preferably not larger than 0.5 $g/m^3$ and more preferably not larger than 0.1 $g/m^3$.

The procedure for removing a solvent from a polyether polymer is not particularly limited. For example, in the case when a solvent slurry polymerization is carried out in the polymerization step, a procedure wherein a polymer recovered by filtration or centrifugal separation is dried by heating or pressure reduction to remove a solvent can be adopted. In the case when a solution polymerization is carried out in the polymerization step, there can be mentioned a direct drying procedure wherein a liquid polymerization mixture as obtained at the stopping step is heated to directly remove a solvent, or a procedure wherein a liquid polymerization mixture is placed in a solvent incapable of dissolving the polyether polymer therein to precipitate the polymer, and then, the solvent is removed by the same procedure as mentioned above for the removal of solvent from the polymer as obtained by a solvent slurry polymerization.

For the drying of polymer, a spray dryer, a rotary dryer, an airborne dryer, a fluidization dryer, a vacuum dryer, an extrusion dryers such as a screw dryer and an expander dryer can be used. These dryers may be used either alone or as a combination of at least two thereof.

As specific example of the procedure for recovering a polymer, there can be mentioned a procedure wherein a polymer slurry is subjected to filtration or centrifugal separation, and the thus-separated polymer is vacuum dried to give polymer particles. More specifically the filtration or centrifugal separation and the vacuum drying can be effected so that the polymer is not contacted with water by the following methods: (i) a method wherein filtration and vacuum drying are carried out by a filter and a dryer, placed in a dry room filled with dry air; (ii) a method wherein filtration and drying are carried out in a closed system by using a filter and a vacuum drier, which are connected to a reaction vessel having a polymer slurry therein; and (iii) a method wherein a solvent is removed by a closed continuous centrifugal separator, and the polymer is dried by a closed continuous paddle vacuum dryer.

Another method can be adopted wherein a polymer slurry is subjected to filtration or centrifugal separation, and then, the separated polymer is introduced into a single screw extruder or a multi-screw extruder whereby the polymer is extruded into a pellet or sheet simultaneously with drying. The polymer of a pellet form can also be obtained by extruding the dried polymer particles, obtained by the above-recited methods, through an extruder. The extrusion can be conducted so that the polymer is not contacted with moisture, for example, in a dry room.

Formed Solid Polymer Electrolyte

The formed solid polymer electrolyte of the present invention is made by mixing the above-mentioned material for solid polymer electrolyte together with an electrolyte salt compound soluble in the polyether polymer, and then shaping the thus-obtained mixture. The formed solid polymer electrolyte has a moisture content preferably in the range of 50 to 1,000 ppm by weight.

Alternatively, a formed solid polymer electrolyte can also be made by mixing the above-mentioned polyether polymer having a moisture content of not larger than 0.04% by weight and a toluene-insoluble content of not larger than 5% by weight, together with an electrolyte salt compound soluble in the polyether polymer, and then shaping the thus-obtained mixture.

The electrolyte salt compound used is not particularly limited provided that it is soluble in the polyether polymer, and, when it is used in a battery provided with a solid polymer electrolyte, it is capable of allowing a cation generated at a cathode to move toward and to be bound with an anion generated at an anode. In the case when the material for solid polymer electrolyte of the present invention is cured and it is used as a cured formed solid polymer electrolyte having a crosslinked structure, the electrolyte salt compound must be soluble in the crosslinked polymer.

As specific examples of the electrolyte salt compound, there can be mentioned salts of an anion selected from fluorine ion, chlorine ion, bromine ion, iodine ion, perchlorate ion, thiocyanate ion, trifluoromethanesulfonate ion, heptafluoropropylsulfonate ion, bis(trifluoromethanesulfonyl) imide ion, bis(heptafluoropropylsulfonyl)imide ion, trifluorosulfoneimide ion, tetrafluoroborate ion, nitrate ion, $AsF_6^-$, $PF_6^-$, stearylsulfonate ion, octylsulfonate ion, dodecylbenzenesulfonate ion, naphthalenesulfonate ion, dodecylnaphtalenesulfonate ion and 7,7,8,8-tetracyano-p-quinodimethane ion, with a cation of metal selected form the group consisting of Li, Na, K, Rb, Cs, Mg, Ca and Ba. In the case when a formed solid polymer electrolyte is used for a lithium polymer battery, $LiBF_4$, $LiPF_6$, $LiCF_3SO_3$, $LiC_4F_9SO_3$, $LiN(CF_3SO_2)_2$ and $LiN(C_2F_5SO_2)_2$ are preferable. These alkali metal salts may be used either alone or as a mixture of at least two thereof.

The amount of the electrolyte salt compound is such that the ratio of mole number of the electrolyte salt compound to mole number of total ether oxygen in the polyether polymer is usually in the range of 0.001 to 5, preferably 0.005 to 3 and more preferably 0.01 to 1. When the amount of electrolyte salt compound is too large, the polymer has poor processability and film-forming property, and the solid electrolyte film has poor mechanical strength and low ionic conductivity. In contrast; when the amount of electrolyte salt compound is too small, a formed solid polymer electrolyte has low ionic conductivity and the battery performance is deteriorated.

The formed solid polymer electrolyte of the present invention is suitable for a cathode material of battery and an ion-conductive electrolyte of battery. In the case when the formed solid polymer electrolyte is used for an ion-conductive electrolyte of battery, the formed solid polymer electrolyte preferably has a crosslinked structure formed by shaping and curing the material for solid polymer electrolyte of the present invention.

When the formed solid polymer electrolyte is used in the form of a crosslinked structure, the crosslinking can be effected after the material for solid polymer electrolyte is formed into a film, or simultaneously with the forming of the material for solid polymer electrolyte into a film. The crosslinking procedure is not particularly limited, and, as examples of the crosslinking procedure, there can be mentioned a procedure wherein a crosslinking agent such as a radical crosslinking agent, sulfur, a mercaptotriazine and a thiourea, is incorporated in the material for solid polymer electrolyte, and the crosslinking agent-incorporated polymer composition is heated, or irradiated with active radiation. Of these, incorporation of radical crosslinking agents such as an organic peroxide and an azo compound, and irradiation with ultraviolet rays, visible light rays and electron rays are preferable. When the crosslinking is carried out, a polyether polymer having the above-mentioned units of crosslink-forming oxirane monomer is preferably used as the polyether polymer constituting the material for solid polymer electrolyte.

As specific examples of the organic peroxide crosslinking agent, there can be mentioned ketone peroxides such as methyl ethyl ketone peroxide and cyclohexanone peroxide; peroxy ketals such as 1,1-bis(t-butylperoxy)-3,3,5-trimethyl-cyclohexane, 2,2-bis(t-butylperoxy)octane and n-butyl-4,4-bis-(t-butylperoxy)valerate; hydroperoxides such as t-butyl-hydroperoxide, cumene hydroperoxide and 2,5-dimethylhexane-2,5-dihydroperoxide; dialkyl peroxides such as di-tert-butyl peroxide, tert-butyl cumyl peroxide, dicumyl peroxide, α,α-bis(tert-butylperoxy-m-isopropyl) benzene, 2,5-dimethyl-2,5-bis(tert-butylperoxy)hexane and 2,5-dimethyl-2,5-bis(tert-butylperoxy)hexyne; diacyl peroxides such as benzoyl peroxide; and peroxy esters such as tert-butylperoxy aetate.

As specific examples of the azo compound crosslinking agent, there can be mentioned azo nitrile compounds such as 2,2'-azobisisobutyronitrile, 2,2'-azobis(2-methylbutyronitrile), 2,2'-azobis(4-methoxy-2,4-dimethylvaleronitrile), 2,2'-azobis-(2,4-dimethylvaleronitrile), 1,1'-azobis(cyclohexane-1-carbonitrile), 2-(carbamoylazo)isobutyronitrile and 2-phenylazo-4-methoxy-2,4-dimethylvaleronitrile; azo amide compounds such as 2,2'-azobis{2-methyl-N-[1,1-bis(hydroxymethyl)-2-hydroxyethyl]propionamide}, 2,2'-azo-bis{2-methyl-N-[1,1-bis(hydroxymethyl)ethyl]propionamide and 2,2'-azobis[2-methyl-N-(2-hydroxyethyl) propionamide]; and azo amidine compounds such as 2,2'-azobis(2-methyl-N-phenylpropionamidine) dihydrochloride, 2,2'-azobis[N-(4-chlorophenyl)-2-methyl-propionamidine]dihydrochloride, 2,2'-azobis[N-(hydroxyphenyl)-2-methylpropionamidine]dihydrochloride, 2,2'-azobis[2-methyl-N-(phenylmethyl)propionamidine] dihydrochloride, 2,2'-azobis[2-methyl-N-(2-propenyl) propionamidine]dihydrochloride, 2,2'-azobis(2-methylpropionamidine) dihydrochloride, and 2,2'-azobis[N-(2-hydroxyethyl)-2-methylpropionamidine] dihydrochloride.

The amount of crosslinking agent is usually in the range of 0.1 to 10 parts by weight, preferably 0.2 to 7 parts by weight and more preferably 0.3 to 5 parts by weight, based on 100 parts by weight of the polyether polymer.

In the case when the crosslinking agent is used, if needed, a crosslinking aid can be used in combination with the crosslinking agent. As specific examples of the crosslinking aid used in combination with an organic peroxide crosslinking agent or an azo compound crosslinking agent, there can be mentioned metal oxides such as zinc oxide and magnesium oxide; metal hydroxide such as calcium hydroxide; metal carbonate salts such as zinc carbonate and basic zinc carbonate; fatty acids such as stearic acid and oleic acid; and fatty acid metal salts such as zinc stearate and magnesium stearate. Further, compounds having at least two crosslink-forming unsaturated bonds in the molecule can also be used in combination with the organic peroxide crosslinking agent. As specific examples of such compounds, there can be mentioned ethylene dimethacrylate, diallyl phthalate, N,N-m-phenylene dimaleimide, triallyl isocyanurate, trimethylolpropane trimethacrylate and liquid vinyl polybutadiene. The crosslinking aid can be used either alone or as a combination of at least two thereof. The amount of crosslinking aid is preferably not larger than 20 parts by weight, more preferably not larger than 15 parts by weight and especially preferably 10 parts by weight, based on 100 parts by weight of the polyether polymer. If the amount of crosslinking aid is too large, the rate of crosslinking is too rapid, blooming to the surface of crosslinked product tends to occur, and the crosslinked product is liable to be too hard.

When the crosslinking is effected by irradiation with active radiation such as ultraviolet rays and electron rays, a photocrosslinking agent can be added, if needed. The photocrosslinking agent includes, for example, benzyldimethylketal, trimethylsylilbenzophenone, benzoin, 4-methoxybenzophenone and benzoin methyl ether anthraquinone and bis(2,4,6-trimethylbenzoyl)phenylphosphine oxide.

To enhance the ionic conductivity, an organic solvent or a plasticizer may be added to the material for solid polymer electrolyte of the present invention. The organic solvent preferably includes non-protonic esters and ethers. The plasticizer preferably includes polyalkylene glycol having a molecular weight of not larger than 5,000. As specific examples of the organic solvent and plasticizer, there can be mentioned propylene carbonate, ethylene carbonate, butylenes carbonate, tetrahydrofuran and ethylene glycol diethyl ether.

No limitation is imposed to the method of shaping the material for solid polymer electrolyte of the present invention into a formed solid polymer electrolyte, but, a method is usually adopted wherein the above-mentioned polyether polymer, electrolyte salt compound and other optional ingredients are mixed together by an appropriate conventional mixing procedure such as, for example, roll mixing and Banbury mixing, and the mixture is formed into a film. The mixing and shaping can be carried out in an extruder. The order in which the ingredients are mixed is not particularly limited, but, it is preferable that ingredients incapable of being easily degraded or decomposed by heat are thoroughly mixed together, and thereafter ingredients capable of being easily reacted or decomposed by heat (for example, crosslinking agent and crosslinking accelerator) are mixed together within a short time.

In the case when an organic solvent or a plasticizer is added, it can be added over a long time after the film-formation and curing, so that the plasticizer gradually permeates the electrolyte, or an organic solvent or a plasticizer can be added when the above-mentioned ingredients are mixed together.

The shape of the formed solid electrolyte includes plate, sheet and film. When the formed solid polymer electrolyte is used for a battery, a film is preferable. The shaping procedure includes, for example, an extrusion shaping procedure, a press-forming procedure, an injection molding procedure and a solution casting procedure. In view of the surface precision and productivity of the formed solid polymer electrolyte, an extrusion shaping procedure is preferable. The material for solid polymer electrolyte exhibits good fluidity when it is extruded into a film through an extruder, and the extruded film exhibits good releasability. When an extrusion shaping procedure is adopted, a die extrusion procedure using a twin screw extruder is especially preferable. When the material for solid polymer electrolyte of the present invention is shaped and cured to form a crosslinked product, the shaping and the curing for crosslinking can be carried out simultaneously, or the curing for crosslinking can be carried out after the shaping. An appropriate means varies depending upon the shaping procedure, the curing procedure and the shape of crosslinked product.

The procedure for extruding the material for solid polymer electrolyte into a solid polymer electrolyte film by a twin screw extruder is not particularly limited, but an extrusion shaping procedure generally adopted for shaping rubber can be adopted. More specifically, the material for solid polymer electrolyte of the present invention is fed through a hopper into a screw of extruder. The polyether polymer is softened by heat transmitted from a barrel, and is moved to a head part of extruder by revolution of screw. The polymer is extruded through a film die provided in the head part of extruder whereby a solid polymer electrolyte film is obtained. An electrolyte salt compound, an active material (which is incorporated when the formed solid polymer electrolyte is used as cathode, as explained below), carbon, and optional plasticizer and other ingredients can be incorporated together with the polyether polymer through a hopper of twin screw extruder, or through an inlet or inlets provided in the midway of barrel. The ratio of length (L) of barrel to inner diameter (D) is usually in the range of 10/1 to 30/1. The barrel temperature is usually 50 to 112° C. The head temperature is usually 60 to 130° C. The die temperature is usually 70 to 130° C.

The solid polymer electrolyte film obtained by extrusion usually has a thickness in the range of 10 to 50 μm, preferably 15 to 30 μm. A cathode film usually has a thickness in the range of 20 to 150 μm, preferably 30 to 100 μm. When the film thickness is too thin, the productivity is liable to be unstable. In contrast, the film thickness is too thick, the ionic conductivity tends to be low and the service capacity of battery becomes poor.

The formed solid polymer electrode of the present invention is suitable for a cathode of battery and an ion-conductive electrolyte of battery.

The kinds of batteries are not limited, and, as examples of the battery, there can be mentioned alkali metal batteries such as lithium, potassium and sodium batteries; halogen salt batteries such as zinc-silver chloride battery, magnesium-silver chloride battery and magnesium-copper chloride battery; and proton conductive batteries such as nickel-hydrogen battery. Of these, a lithium ion secondary battery is preferable because its service capacity is high and lithium ion has a high conductivity within the solid electrolyte. The battery is preferably provided with an electrolyte which does not contain a liquid electrolyte but is comprised only of a solid polymer electrolyte.

In the case when the battery is a lithium battery, it is preferably provided with a cathode film, an anode film and an ion-conductive electrolyte film, wherein at least one of the cathode film and the ion-conductive electrolyte film is made of the formed solid polymer electrode of the present invention.

In the case when the formed solid polymer electrolyte is used as an ion-conductive electrolyte, the formed solid polymer electrolyte preferably has a crosslinked structure as mentioned above. The ion-conductive electrolyte is an ion-conductive electrolyte film having mainly a function of liquid electrolyte interposed between a cathode and an anode, and further a function of a separator interposed between a cathode and an anode.

In the case when the formed solid polymer electrolyte is used as a cathode of battery as mentioned above, finely divided active material particles and finely divided electrically conductive material particles are incorporated in the material for solid polymer electrolyte of the invention when the material for solid polymer electrolyte is shaped into the formed solid polymer electrolyte.

As specific examples of the active material, there can be mentioned $LiCoO_2$, lithium-manganese composite oxide, $LiNiO_2$, $V_2O_5$, $V_6O_{13}$ and lithium-vanadium composite oxide. The average particle diameter of these finely divided active material particles is not particularly limited, but, when the formed solid polymer electrolyte is used in a film form, the average particle diameter is preferably in the range of 0.5 to 30 μm, more preferably 0.6 to 20 μm. When the particle diameter is too large, the formed solid polymer electrolyte tends to have poor surface smoothness. In contrast, when the particle diameter is too small, the particles are difficult to uniformly disperse. The amount of active material is preferably in the range of 0.1 to 50 times, more preferably 0.3 to 20 times and especially preferably 0.5 to 10 times, of the weight of polyether polymer. When the amount of active material is too small, the function of a cathode as an electrode is poor. In contrast, when the amount of active material is too large, the dispersibility of particles is reduced and the material for solid polymer electrolyte is difficult to process and shape.

The finely divided electrically conductive material particles include, for example, particles of acetylene black, Ketchen black and graphite. The amount of electrically conductive material is preferably in the range of 1 to 20 parts by weight, more preferably 2 to 15 parts by weight, based on 100 parts by weight of active material. When the amount of electrically conductive material is too small, the electrical conductivity of a cathode is poor. In contrast, when the amount of electrically conductive material is too large, the dispersibility of particles is reduced.

The material for solid polymer electrolyte of the present invention also exhibits a function of a binder for an active material and an electrically conductive material. From this point of view, the material for solid polymer electrolyte is preferably used when an active material and an electrically conductive material are used.

An anode material includes, for example, alloys, oxides and carbonaceous materials, which are capable of occluding and releasing lithium and lithium metal.

EXAMPLES

Now the invention will be described more specifically by the following examples and comparative examples, that by no means limit the scope of the invention.

In these examples and comparative examples, solvents and monomers were used after they were subjected to deaerating and dehydration treatments; and all of the operations were carried out under dehydrated conditions in an inert gas atmosphere.

Parts and % in the examples and comparative examples are by weight unless otherwise specified.

Characteristics were determined by the following methods.

(1) Composition of Polymer

Composition of a polyether polymer was determined by 500 MHz H-NMR and $C_{13}$—NMR measurements.

(2) Moisture Content

Moisture content in a polyether polymer was determined from the moisture content (a) in a solution of the polymer in toluene, and the moisture content (b) in the toluene used. The moisture content (a) in the polymer solution in toluene was measured by Karl-Fischer measurement instrument. The moisture content in the polyether polymer was calculated from the following equation.

Moisture content=[(a)−(b)]/(concentration of polymer in the solution).

(3) Toluene-Insoluble Content 0.2 g of a polyether polymer was immersed in 100 ml of toluene and the mixture was shaken at 40° C. for 3 hours. Then the thus-obtained solution was filtered through a 150 mesh wire gauze. The insolubles on the wire gauze were dried and weighed. The toluene-insoluble content (% by weight) was determined as the ratio of the weight of dried insloubles to the weight (0.2 g) of polymer as measured before dissolution of the soluble matter. The smaller the toluene-insoluble content, the smaller the amount of crosslinked product.

(4) Weight Average Molecular Weight (Mw) and Molecular Weight Distribution (Mw/Mn)

Mw and Mw/Mn were determined by gel permeation chromatography (GPC) measurement carried out under the following conditions.

Apparatus: GPC system (available from Tosoh Corporation)

Column: G7000HHR+GMHHR-H (both available from Tosoh Corporation)

Solvent: dimethylformamide (DMF) (solution of lithium bromide 5 mmol/liter)

Flow rate: 1 ml/min

Column temperature: 40° C.

Standard substance for molecular weight: standard polystyrene (available from Polymer Laboratory Co.)

(5) Barrel Pressure

During extrusion of material for solid polymer electrolyte into film, the pressure (barrel pressure: MPa) of material for solid polymer electrolyte passing through a barrel was measured by a pressure gauge (available from Dynisco Co.) set at a location in the barrel, 15 mm distant from the tip end of a die. When the pressure was fluctuated, an average pressure was determined from the region of fluctuated pressures.

(6) Film Strength 100 parts of a polyether polymer and 22 parts of bistrifluoromethylsulfonylimidelithium were mixed together and kneaded. A #3 dumbbell specimen having a thickness of 2 mm was prepared from the kneaded mixture. Tensile strength of the specimen was measured.

(7) Film Tackiness

Film tackiness was determined by measuring an adhesion between a specimen film and a polypropylene (abbreviated to "PP" when appropriate) film by the following method.

100 parts of a polyether polymer, 330 parts of lithium cobalt oxide, 21 parts of and 14 parts of Ketchen black were kneaded together with bistrifluoromethylsulfonylimidelithium by a Brabender kneader to prepare a composition for cathode. This composition was sandwiched between two PP films, and then the sandwich was pressed at 100° C. under 5 MPa for 2 minutes. The sandwich was cut into strips having a width of 1 inch. PP film on one side of the sandwich was partly peeled at both ends of each strip. The peeled PP film ends were set on a tensile tester, and peel strength was measured at a temperature of 23° C. and a drawing rate of 500 mm/min. Thus the tackiness of film was expressed by peel strength of film of composition for cathode.

(8) Ionic Conductivity

Ionic conductivity was determined by a complex impedance method as follows. That is, 100 parts of a polyether polymer and 20 parts of bistrifluoromethylsulfonylimidelithium were kneaded together by a Brabender kneader to prepare a polymer composition. The polymer composition was pressed-formed into a sheet having a thickness of 2 mm, and the sheet was vacuum-dried at a temperature of 30° C. under a pressure below 1 mmHg for 72 hours. Then, the dried sheet was sandwiched between platinum electrodes and tested at a voltage of 0.5 V and a frequency range of 5 Hz to 13 Hz by an alternating current method.

(9) Cyclic Characteristics

A cell was assembled by using a cathode film made in each of examples and comparative examples, and cyclic characteristics of the cell were evaluated as follows.

First, a solid polymer electrolyte film was prepared as follows. That is, to 3,000 parts of a polyether polymer, bistrifluoromethylsulfonylimidelithium was added in an amount such that the ratio of the amount by mole of the electrolyte salt to the amount by mole of oxygen atom in the polyether polymer was 0.05. Further 3 parts of benzyldimethylketal as a photo-curing agent was added and the resultant mixture was thoroughly stirred. The mixture was extruded through a twin-screw extruder at a screw temperature of 80° C., a revolution number of 150 ppm and a die temperature of 155° C. into a film. The film was continuously adhered on a polypropylene (PP) film and irradiated with ultraviolet light to be thereby cured. The cured film was separated from the PP film to obtain a solid polymer electrolyte film having an average thickness of 50 μm.

Then, the above-mentioned solid polymer electrolyte film was sandwiched between the cathode film made in each of examples and comparative examples, and a lithium metal foil to make a cell. Charge and discharge characteristics of the cell were evaluated on a cell sample having a size of 20 mm×20 mm. That is, a constant current charge-discharge test was conducted wherein the charge was carried out until voltage reached to 4.2 V at 0.2 mA and the discharge was carried out until voltage reached to 2.7 V at 0.2 mA. The cycle characteristics of battery were evaluated by the ratio (%) of the service capacity of the cell at the tenth cycle to the service capacity thereof at the third cycle, and by the ratio (%) of the service capacity thereof at the 50th cycle to the service capacity thereof at the third cycle. As these ratios in % are larger, the reduction of service capacity of battery is smaller and the battery is more satisfactory.

(10) Cyclic Voltammetry

Using stainless steel as a working electrode, and metal lithium as a counter electrode and a reference electrode, cyclic voltammetry (CV) of each of the solid polymer electrolyte films made in Examples 4 and 5 was measured. The measurement was carried out at a temperature of 60° C. and a sweep rate of 2 mV/sec from 2V to 5V. As the current value (I) is smaller in the relationship of potential (E) with current value (I), the electrical stability is better.

Example 1

Preparation of Material for Solid Polymer Electrolyte A

An autoclave equipped with a stirrer was dried and flushed with nitrogen gas, and then, charged with 65.1 parts of triisobutylaluminum, 217.9 parts of toluene and 121.6 parts of diethyl ether. The inside temperature was set at 30° C., and 11.26 parts of phosphoric acid was added at a constant rate over a period of 10 minutes while being stirred. Then, 4.97 parts of triethylamine was added, and the mixture was maintained at 60° C. for 2 hours to give a catalyst solution.

An autoclave equipped with a stirrer was dried and flushed with nitrogen, and was charged with 1,514 parts of n-hexane and 63.3 parts of the above-mentioned catalyst solution. The inside temperature was set at 30° C., and 7.4 parts of ethylene oxide was added while being stirred, to carry out a reaction. Then, 14.7 parts of an equal weight monomer mixture of ethylene oxide and propylene oxide was added to carry out a polymerization for producing a seed.

The inside temperate was set at 60° C., and then, a mixed solution of 439.6 parts (92% by mole) of ethylene oxide, 50.4 parts (8% by mole) of propylene oxide and 427.4 parts of n-hexane was continuously added to the seed-containing polymerization liquid at a constant rate over a period of 5 hours. After completion of addition, a polymerization was carried out for 2 hours. The polymerization conversion was 98%. To the resultant polymer slurry, 42.4 parts of a 5% solution in toluene of 4,4'-thiobis-(6-tert-butyl-3-methylphenol) as an antioxidant was added with stirring. Then, to adjust the moisture content, 0.4 part of distilled water was added to the slurry with stirring. A polymer crumb was separated by filtration, and vacuum dried at 40° C. to give a powdery polymer.

The thus-obtained polyether polymer A (material for solid polymer electrolyte A) had a composition, as expressed by the amounts of monomer units, comprised of 91.5% by mole of ethylene oxide (EO) units and 8.5% by mole of propylene oxide (PO) units. This polymer had Mw of 350,000, Mw/Mn of 10.2, and a moisture content of 650 ppm.

Production of Formed Solid Polymer Electrolyte

To 100 parts of material for solid polymer electrolyte A, 22 parts of bistrifluoromethylsulfonylimidelithium was added to prepare a composition for solid polymer electrolyte. The composition was extruded through a twin-screw extruder at a screw temperature of 80° C., a revolution number of 150 rpm and a die temperature of 155° C. into a film, while 330 parts of lithium cobalt oxide and 13 parts of Ketchen black were added in the midway of passing through a barrel of the extruder. The extruded film was continuously sandwiched between a polypropylene (PP) film and an aluminum foil on a roll, and the composite of PP film, solid polymer electrolyte film and aluminum foil was wound into a coil.

The barrel pressure within the extruder was measured during the above-mentioned extrusion of material for solid polymer electrolyte A, and the processing and shapability of material for solid polymer electrolyte A were evaluated by the measured barrel pressure. Mechanical strength, tackiness (releasability from PP film) and ionic conductivity of the solid polymer electrolyte film were evaluated. Cycle characteristics of battery were also evaluated. The results are shown in Table 1.

Example 2

Preparation of Material for Solid Polymer Electrolyte B

By the same procedures as described in Example 1, a polyether polymer was prepared wherein the amount of distilled water added was changed to 0.8 part with all other conditions remaining the same. The thus-obtained polyether polymer (material for solid polymer electrolyte B) had a moisture content of 1,550 ppm. The amount of ethylene oxide (EO) monomer units, Mw and Mw/Mn of the polyether polymer are shown in Table 1.

Production of Formed Solid Polymer Electrolyte

A cathode film was produced by extrusion shaping and its properties were evaluated by the same procedures as described in Example 1 except that material for solid polymer electrolyte B was used instead of material for solid polymer electrolyte A with all other conditions remaining the same. The results are shown in Table 1.

Example 3

Preparation of Material for Solid Polymer Electrolyte C

By the same procedures as described in Example 1, a polyether polymer was prepared wherein the amount of distilled water added was changed to 1.5 parts with all other conditions remaining the same. The thus-obtained polyether polymer (material for solid polymer electrolyte C) had a moisture content of 3,000 ppm. The amount of ethylene oxide (EO) monomer units, Mw and Mw/Mn of the polyether polymer are shown in Table 1.

Production of Formed Solid Polymer Electrolyte

A cathode film was produced by extrusion shaping and its properties were evaluated by the same procedures as described in Example 1 except that material for solid polymer electrolyte C was used instead of material for solid polymer electrolyte A with all other conditions remaining the same. The results are shown in Table 1.

Comparative Example 1

Preparation of Material for Solid Polymer Electrolyte D

By the same procedures as described in Example 1, a polyether polymer was prepared wherein the amount of distilled water added was changed to 0.1 part with all other conditions remaining the same. The thus-obtained polyether polymer (material for solid polymer electrolyte D) had a moisture content of 200 ppm. The amount of ethylene oxide (EO) monomer units, Mw and Mw/Mn of the polyether polymer are shown in Table 1.

Production of Formed Solid Polymer Electrolyte

A cathode film was produced by extrusion shaping and its properties were evaluated by the same procedures as described in Example 1 except that material for solid polymer electrolyte D was used instead of material for solid polymer electrolyte A with all other conditions remaining the same. The results are shown in Table 1.

Comparative Example 2

Preparation of Material for Solid Polymer Electrolyte E

By the same procedures as described in Example 1, a polyether polymer was prepared wherein the amount of distilled water added was changed to 2.7 parts with all other conditions remaining the same. The thus-obtained polyether polymer (material for solid polymer electrolyte E) had a moisture content of 5,500 ppm. The amount of ethylene oxide (EO) monomer units, Mw and Mw/Mn of the polyether polymer are shown in Table 1.

Production of Formed Solid Polymer Electrolyte

A cathode film was produced by extrusion shaping and its properties were evaluated by the same procedures as described in Example 1 except that material for solid polymer electrolyte E was used instead of material for solid polymer electrolyte A with all other conditions remaining the same. The results are shown in Table 1.

Comparative Example 3

Production of Formed Solid Polymer Electrolyte

A cathode film was produced by extrusion shaping and its properties were evaluated by the same procedures as described in Example 1 except that polyether polymer for material for solid polymer electrolyte D prepared in Comparative Example 1 was used instead of the polyether polymer for material for solid polymer electrolyte A prepared in Example 1, and 20 parts of tetraethylene glycol dimethyl ether was added into the inlet of extruder with all other conditions remaining the same. The results are shown in Table 1.

Comparative Example 4

Preparation of Material for Solid Polymer Electrolyte F

By the same procedures as described in Example 1, a polyether polymer was prepared wherein the amount of phosphoric acid was changed to 14.5 parts and the amount of triethylamine was changed to 3.31 parts at the step of preparation of catalyst, and the amount of distilled water added was changed to 0.1 part with all other conditions remaining the same. The thus-obtained polyether polymer (material for solid polymer electrolyte F) had a moisture content of 200 ppm. The amount of ethylene oxide (EO) monomer units, Mw and Mw/Mn of the polyether polymer are shown in Table 1.

Production of Formed Solid Polymer Electrolyte

A cathode film was produced by extrusion shaping and its properties were evaluated by the same procedures as described in Example 1 except that material for solid polymer electrolyte F was used instead of material for solid polymer electrolyte A with all other conditions remaining the same. The results are shown in Table 1.

TABLE 1

|  | Examples | | | Comparative Examples | | | |
| --- | --- | --- | --- | --- | --- | --- | --- |
|  | 1 | 2 | 3 | 1 | 2 | 3 | 4 |
| Material for solid polymer electrolyte | A | B | C | D | E | — | F |
| Polymer properties | | | | | | | |
| Content of EO units (mole %) | 91.5 | 91.4 | 91.6 | 91.5 | 91.5 | 91.5 | 91.5 |
| Mw | 350,500 | 360,000 | 351,000 | 340,000 | 350,000 | 340,000 | 200,000 |
| Mw/Mn | 10.2 | 10.7 | 10.3 | 10.5 | 10.5 | 10.5 | 10.5 |
| Content of water (ppm) | 650 | 1,550 | 3,000 | 200 | 5,500 | 200 | 200 |
| Ingredient added: plasticizer *1 (parts) | — | — | — | — | — | 20 | — |
| Extrusion, barrel pressure (MPa) | 12 | 10 | 9 | 30 | 8.5 | 15 | 12 |
| Film properties | | | | | | | |
| 300% tensile modulus | 2.8 | 2.8 | 2.6 | 2.8 | 2.4 | 0.8 | 0.8 |
| Peel strength (Nm) | 0.05 | 0.05 | 0.07 | 0.05 | 0.08 | 1.5 | 2.1 |
| Ionic conductivity (1/s) | 2.3E−05 | 2.5E+00 | 2.8E−05 | 2.1E−05 | 3.1E−05 | 4.1E−05 | 2.5E−05 |
| Battery characteristics | | | | | | | |
| Cycle characteristics at 10th cycle (%) | 97 | 96 | 93 | 97 | 88 | 94 | 96 |
| Cycle characteristics at 50th cycle (%) | 91 | 90 | 88 | 91 | 81 | 88 | 90 |

Note,
*1: Tetraethylene glycol dimethyl ether (parts per 100 parts of polyether polymer)

As seen from Examples 1-3 in Table 1, when material for solid polymer electrolytes A, B and C of the present invention are extruded into films, the pressure of barrel of an extruder is low and thin films can be obtained with high efficiency. The thin films have high mechanical strength and low tackiness. When these films are used as cathode for a lithium polymer battery, a battery having improved cycle characteristics can be obtained.

In contrast, when material for solid polymer electrolytes D and F comprised of a polyether polymer having a moisture content of 200 ppm are extruded into films (Comparative Examples 1 and 4), the pressure of barrel of an extruder is too high and it is difficult to stably obtain films. The films have poor mechanical strength. When material for solid polymer electrolyte E comprised of a polyether polymer having a moisture content of 5,500 ppm is extruded into a film (Comparative Example 2), the film has a poor tensile strength and, when the film is used for making a cathode for a lithium polymer battery, the resulting battery has poor cycle characteristics. When a polyether polymer having a moisture content of 200 ppm is kneaded together with tetraethylene glycol dimethyl ether as a plasticizer, and the plasticized polymer is extruded into a film (Comparative Example 3), the polymer pressure cannot be reduced to the desired extent at the extrusion step, and the film has poor mechanical strength and exhibits strong tackiness. Thus the film has poor handling characteristics.

Example 4

Preparation of Material for Solid Polymer Electrolyte G

An autoclave equipped with a stirrer was dried and flushed with nitrogen gas, and then, charged with 158.7 parts of triisobutylaluminum, 1,170 parts of toluene which had been previously dehydrated with molecular sieve 4 A and deaerated, and 296.4 parts of diethyl ether. The inside temperature was set at 30° C., and 23.5 parts of phosphoric acid was added at a constant rate over a period of 10 minutes while being stirred. Then, 12.1 parts of triethylamine was added, and the mixture was maintained at 60° C. for 2 hours to give a catalyst solution.

Another autoclave equipped with a stirrer was dried and flushed with nitrogen, and was charged with 2,100 parts of n-hexane which had been previously dehydrated with molecular sieve 4 A. The moisture content in the charged n-hexane was 9 ppm (0.019 part). Further 73.1 parts of the above-mentioned catalyst solution was added. The inside temperature was set at 30° C., and 4 parts of ethylene oxide was added while being stirrer to carry out a reaction. Then, 8.5 parts of an equal weight monomer mixture of ethylene oxide and propylene oxide, both of which had been previously dehydrated, was added to carry out a polymerization for producing a seed.

The inside temperature was set at 60° C., and then, a mixed solution of 340 parts (90% by mole) of ethylene oxide, 14.9 parts (3% by mole) of propylene oxide, 68.4 parts (7% by mole) of allyl glycidyl ether and 300 parts of n-hexane was continuously added to the seed-containing polymerization liquid at a constant rate over a period of 5 hours. After completion of addition, a polymerization was carried out for 2 hours, and the polymer slurry was cooled to 30° C. The polymerization conversion was 99%. The polymer slurry had a moisture content of 0 ppm. To the resultant polymer slurry, 8.5 parts of ethanol which had been previously dehydrated to a moisture content of 350 ppm (the moisture content was 0.0007% based on polymer) was added, and the mixture was stirred for 30 minutes. Then 42.4 parts of a 5% solution in toluene of 4,4'-thiobis(6-tert-butyl-3-methylphenol) as an antioxidant was added and the mixture was stirred for 30 minutes. Then, to adjust the moisture content, 0.4 part of distilled water was added to the slurry with stirring. A polymer crumb was separated by filtration, and vacuum-dried at 40° C. to give a powdery polymer.

A vessel was flushed with nitrogen and dried, and the vessel was connected to the autoclave containing the polymer slurry. The polymer slurry was taken from the autoclave into the vessel in a manner such that the polymer is not contacted with the outside air. Then 1,500 parts of n-hexane, which had been previously dehydrated with molecular sieve 4 A into a moisture content of 9 ppm (the moisture content was 0.0032% based on polymer), as a washing solvent was placed in the autoclave from which the polymer slurry had been taken out, and the content of autoclave was stirred for 30 minutes. The washing solvent was taken from the autoclave into the vessel containing the polymer slurry in a manner such that the washing solvent is not contacted with the outside air. The moisture content in the washing solvent-incorporated polymer slurry was 0.006% based on polymer.

The polymer slurry was filtered through a wire gauze in a dry nitrogen gas atmosphere, and the residue was vacuum dried at 40° C. to obtain a powdery polymer. The thus-obtained polyether polymer (material for solid polymer electrolyte G) had a composition, as expressed by the amounts of monomer units, comprised of 89.0% by mole of ethylene oxide (EO) units, 4.2% by mole of propylene oxide (PO) units, and 6.8% by mole of allyl glycidyl ether (AGE) units. The moisture content, weight average molecular weight, and toluene-insoluble content of this polymer were measured. The results are shown in Table 2.

Production of Solid Polymer Electrolyte Film

One part of material for solid polymer electrolyte G and 0.31 part of bistrifluoromethylsulfonylimidelithium (LiTFSI) were dissolved in 20 parts of tetrahydrofuran. The thus-prepared solution was placed in a Petri dish made of polytetrafluoroethylene and vacuum-dried at 40° C. for 24 hours to obtain a solid polymer electrolyte film having a thickness of 100 μm. The surface state of the film was very smooth. Ionic conductivity and cyclic voltammetry (CV) of the film were measured. The results are shown Table 2.

Example 5

Preparation of Material for Solid Polymer Electrolyte H and Production of Solid Polymer Electrolyte Film A pressure glass bottle with stopper was flushed with nitrogen, and then, was charged with 180 parts of toluene and 60 parts of triisobutylaluminum. The glass bottle was immersed in an ice water bath to be thereby cooled. Then 224.2 parts of diethyl ether was added and the mixture was stirred. Then 8.89 parts of phosphoric acid was added and the mixture was stirred while the glass bottle was cooled in the ice water bath. During cooling of the bottle, the inner pressure of the bottle was released at intervals to avoid the elevation of inner pressure due to a reaction of triisobutylaluminum with phosphoric acid. Then 8.98 parts of a formic acid salt of 1,8-diaza-bicyclo (5,4,0)undecene-7. The thus-obtained reaction mixture was maintained in a warm water bath at 60° C. for 1 hour to obtain a catalyst solution.

By the same procedures as described in Example 4, polymerization was carried out to give a powdery polymer wherein the above-mentioned catalyst solution was used with all other conditions remaining the same. The polymerization conversion was 98.9%.

The thus-obtained polyether polymer (material for solid polymer electrolyte H) had a composition, as expressed by the amounts of monomer units, comprised of 90% by mole of ethylene oxide (EO) units, 3.2% by mole of propylene oxide (PO) units, and 6.8% by mole of allyl glycidyl ether (AGE) units. Properties of this polymer were evaluated. The results are shown in Table 2.

By the same procedures as described in Example 4, a solid polymer electrolyte film was made wherein material for solid polymer electrolyte H was used instead of material for solid polymer electrolyte G Surface state of the film and properties thereof are evaluated. The results are shown in Table 2.

TABLE 2

|  |  | Examples | |
|---|---|---|---|
|  |  | 4 | 5 |
|  |  | Material for solid polymer electrolyte | |
|  |  | G | H |
| Moisture content in stopper | (%) | 0.0007 | 0.0007 |
| Moisture content in washing solvent | (%) | 0.0032 | 0.0032 |
| Moisture content in slurry | (%) | 0.006 | 0.008 |
| Moisture content in polymer | (%) | 0.007 | 0.009 |
| Toluene-insoluble content in polymer | (%) | 0.5 | 0.2 |
| Weight average molecular weight of polymer | ($\times 10^{-5}$) | 3.0 | 3.1 |

TABLE 2-continued

| | | | Examples | |
| --- | --- | --- | --- | --- |
| | | | 4 | 5 |
| | | | \multicolumn{2}{c}{Material for solid polymer electrolyte} |
| | | | G | H |
| Surface state of film | | | Smooth | Smooth |
| Ionic conductivity | | (S/cm) | $5.1 \times 10^{-5}$ | $6.3 \times 10^{-5}$ |
| CV value at voltage of | 2 | (V) | 0 | 0 |
| | 2.5 | | 0 | 0 |
| | 3 | | 0 | 0 |
| | 3.5 | | 0 | 0 |
| | 4 | | 0 | 0 |
| | 4.5 | | 0 | 1 |
| | 5 | | 7 | 12 |

Note,
All of the moisture contents are based on polymer

As seen from Table 2, according to the process wherein the moisture content in a system containing a polyether polymer is adjusted in a specific range at the polymerization-stopping step and the succeeding step, a polyether polymer containing a small amount of water and a small amount of toluene-insolubles is obtained. A solid polymer electrolyte film made from the polyether polymer has smooth surface, and good ionic conductivity and excellent electrical stability (Examples 4 and 5).

INDUSTRIAL APPLICABILITY

The material for solid polymer electrolyte of the present invention exhibits good processability and shapability when it is formed into a formed solid polymer electrolyte. The formed solid polymer electrolyte exhibits high ionic conductivity, and has high mechanical strength even though the formed electrolyte is thin. Further the formed solid polymer electrolyte exhibits good releasability.

The formed solid polymer electrolyte is suitable for a cathode of battery and ionic conductive electrolyte of battery. The kind of battery is not particularly limited, and, as examples of the battery, there can be mentioned alkali metal batteries such as lithium, potassium and sodium batteries; halogen salt batteries such as zinc-silver chloride battery, magnesium-silver chloride battery and magnesium-copper chloride battery; and proton conductive batteries such as nickel-hydrogen battery. Of these, a lithium ion secondary battery is preferable because its service capacity is high and lithium ion has a high conductivity within the solid electrolyte. The battery preferably has a structure such that the electrolyte does not contain a liquid electrolyte and is comprised only of a solid electrolyte. A battery provided with a cathode or an electrolyte, which is comprised only of the solid polymer electrolyte, exhibits high service capacity and good cycle characteristics.

The polyether polymer of the present invention contains a small amount of water and a small amount of crosslinked structure, and therefore, exhibits good processability and shapability or formability, and gives a formed solid polymer electrolyte having a smooth surface. In view of these beneficial properties, the polyether polymer is suitable for rubber rolls such as a fiber- or yarn-spinning rubber roll and a rubber roll for OA instruments, and sealing materials such as water-swollen water-stopping seals and packings, as well as ion-conductive materials such as a solid electrolyte and anti-static agent.

The invention claimed is:

1. A shaping material for solid polymer electrolyte, comprised of a polyether polymer having a moisture content in the range of 400 to 5,000 ppm by weight,
   wherein said polyether polymer comprises 70 to 99% by mole of units (A) derived from an ethylene oxide monomer (a) and 1 to 30% by mole of units (B) derived from another oxirane monomer (b) which is copolymerizable with the ethylene oxide monomer (a),
   wherein said other oxirane monomer (b) comprises
      propylene oxide monomer,
      at least one kind of monomer selected from the group consisting of glycidyl ethers having 1 to 10 carbon atoms and oxides of a vinyl compound, and
      0.1 to 5% by mole, based on the total amount of ethylene oxide monomer (a) and oxirane monomer (b), of a diepoxy compound monomer,
   wherein said polyether polymer has a weight average molecular weight (Mw) in the range of 100,000 to 1,500,000, and
   wherein said polyether polymer has a molecular weight distribution, as expressed by a ratio (Mw/Mn) of weight average molecular weight (Mw) to number average molecular weight (Mn), in the range of 1.5 to 13.

2. The shaping material for solid polymer electrolyte according to claim 1, wherein the oxirane monomer (b) further comprises not larger than 15% by mole, based on the total oxirane monomers, of an oxirane monomer (c) having a crosslink-forming functional group as a part of the oxirane monomer (b).

* * * * *